(12) United States Patent
Shimogama

(10) Patent No.: US 6,278,082 B1
(45) Date of Patent: Aug. 21, 2001

(54) WELDING APPARATUS

(75) Inventor: Shigeru Shimogama, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/414,636

(22) Filed: Oct. 8, 1999

(30) Foreign Application Priority Data

Oct. 16, 1998 (JP) .................................................. 10-294771

(51) Int. Cl.[7] .................................................. B23K 9/12
(52) U.S. Cl. .................................. 219/130.5; 219/125.1; 901/42
(58) Field of Search .............................. 219/124.1, 125.1, 219/125.11, 124.34, 130.01, 130.5; 901/42

(56) References Cited

U.S. PATENT DOCUMENTS

| 4,590,577 |   | 5/1986  | Nio et al. . |           |
|-----------|---|---------|--------------|-----------|
| 4,616,326 |   | 10/1986 | Meier et al. . |         |
| 4,959,523 | * | 9/1990  | Fihey et al. | 219/124.34 |
| 5,148,000 | * | 9/1992  | Tews         | 219/125.11 |
| 5,305,183 | * | 4/1994  | Teynor       | 219/130.01 |
| 5,932,123 | * | 8/1999  | Marhofer et al. | 219/125.11 |

FOREIGN PATENT DOCUMENTS

| 63-119979 | 5/1988 | (JP) . |
| 9-85443   | 3/1997 | (JP) . |

OTHER PUBLICATIONS

European Search Report, EP 99 12 0457, dated Feb. 7, 2000.

* cited by examiner

*Primary Examiner*—Clifford C. Shaw
(74) *Attorney, Agent, or Firm*—Stevens, Davis, Miller & Mosher, LLP

(57) ABSTRACT

A welding apparatus, wherein the robot controller of the teaching playback type robot thereof is combined with the control portion of the welding power source thereof, each of the control portions of the robot controller and the welding power source is a digital-control type and provided with a digital communication control portion, and welding condition commands including at least a welding current command value are transmitted by using digital data through the communication control portions from the robot controller to the control portion of the welding power source. The present invention can thus provide a welding apparatus excluding conversion errors because of the existence of analog circuits.

2 Claims, 4 Drawing Sheets

WELDING APPARATUS

BACKGROUND OF THE INVENTION

1. Field of the Invention

The present invention relates to a welding apparatus, such as an arc welding apparatus for a welding robot system formed of a combination of a teaching playback type robot and a welding power source.

2. Prior Art

A prior art embodiment has a configuration shown in FIG. 4, as disclosed in Japanese Laid-open Patent Application No. Hei 9-85443.

First, the robot controller and the welding power source of the prior art embodiment are each provided with an analog command voltage value uniquely determined for a welding current command value, an analog command voltage value uniquely determined for a welding voltage command value and output characteristic curves for uniquely determining the respective values. Referring to FIG. 4, a welding current command signal i and a welding voltage command signal v are issued from a robot controller 101 to a welding power source 103 as analog voltage signals on the basis of their output characteristic curves via D/A converters respectively corresponding thereto. The analog command voltages are converted into digital data by the A/D converters of the welding power source 103, and a welding current command value and a welding voltage command value are obtained on the basis of the output characteristic curves, and taken in the welding condition control portion of the welding power source 103.

Next, the welding condition control portion carries out control to output an actual welding current and an actual welding voltage corresponding to the welding current command value and the welding voltage command value, respectively. At this time, for the robot, a movement target position is designated by teaching, and whether the target position having been designated by teaching is a welding position or not is determined by teaching. In addition, when the target position is a welding position, welding condition command values are also designated by teaching and stored as data in the memory inside the robot controller 101.

During robot operation, the welding torch of the robot 5 moves in accordance with the data designated by teaching and stored in the memory. When the welding torch of the robot 5 reaches the predetermined arc welding position, a welding current command voltage and a welding voltage command voltage, which are analog command voltages to be output to the welding power source 103, are obtained on the basis of the output characteristic curves of the welding current command and the welding voltage command in accordance with the data designated by teaching and stored in the memory. Binary data is then set and written to the buses of the D/A converters so that their desired command voltages are generated.

By this operation, the desired actual welding current and voltage are output to the welding power source 103.

Furthermore, as disclosed in Japanese Laid-open Patent Application No. Sho 63-119979, another prior art embodiment has a configuration wherein its robot controller must be provided with a hardware device for each condition to be commanded to the welding power source.

However, both the control portion of the robot controller 101 and the control portion of the welding power source 103 are digital circuits mainly composed of microcomputers. At the interface to the above-mentioned welding power source, the welding current and voltage command values, which are digital data, are D/A converted into analog commands, respectively, on the basis of their output characteristic curves, and transmitted from the robot to the welding power source. At the welding power source, the respective analog voltages are A/D converted into digital data on the basis of their output characteristic curves, and welding control is carried out.

Although the two control portions are digital circuits, analog circuits are present as described above, thereby causing conversion errors. This causes a problem wherein the welding current command value and the welding voltage command value transmitted from the robot are different from the welding current command value and the welding voltage command value received by the welding power source.

Furthermore, the prior art embodiment also causes a problem wherein the analog circuits are affected by drift because of changes in environment (temperature in particular) and changes with time.

In addition, in the case when the welding power source 103 or the robot controller 101 becomes faulty and at least one of them is replaced, welding confirmation adjustment comprising welding and condition calling must be carried out, even when the teaching data on the robot side is identical, because the individual analog circuits are slightly different from each other although there is no difference in model. This causes a problem of being unable to resume the operation of the robot welding system promptly.

Accordingly, the present invention is intended to provide a welding apparatus for an automatic welding line using a robot and a welding power source, comprising a digital communication control portion provided for each of the robot controller and the welding power source thereof, wherein welding current and voltage command values, which are digital data, are transmitted from the robot to the welding power source by digital communication, thereby excluding conversion errors because of the existence of the analog circuits of the prior art embodiment.

SUMMARY OF THE INVENTION

The welding apparatus of the present invention is a welding apparatus wherein the robot controller of its teaching playback type robot is combined with the control portion of its welding power source. Each of the control portions of the robot controller and the welding power source is a digital-control type and provided with a digital communication control portion. Welding condition commands including at least a welding current command value are transmitted by using digital (discrete) data through the communication control portions from the robot controller to the control portion of the welding power source.

In accordance with the welding apparatus of the present invention, welding condition commands are transmitted as digital data from the robot controller to the welding power source via the communication control portions. As a result, it is not necessary to use means for converting digital data into analog data, and it is thus possible to attain signal transmission without conversion errors. Therefore, the apparatus is not affected by drift because of the existence of analog circuits, and not affected by individual differences in analog circuits at the time of device replacement. Furthermore, since digital communication is used instead of analog transmission, transmission time can be shortened significantly, and information can be transmitted quickly, whereby prompt welding control can be carried out.

In the above-mentioned apparatus, information on welding speed is transmitted as digital data from the robot controller to the control portion of the welding power source at the start of welding.

In accordance with this configuration, welding control corresponding to three kinds of welding condition commands can be carried out. Therefore, it is not necessary to prepare individual hardware devices, and only the communication control portion is provided for each of the robot controller and the welding power source, whereby the apparatus is excellent in expandability. It is thus possible to provide inexpensive products to users.

DETAILED DESCRIPTION OF THE INVENTION

Embodiments in accordance with the present invention will be described below referring to FIGS. 1, 2 and 3.

Figure 1:
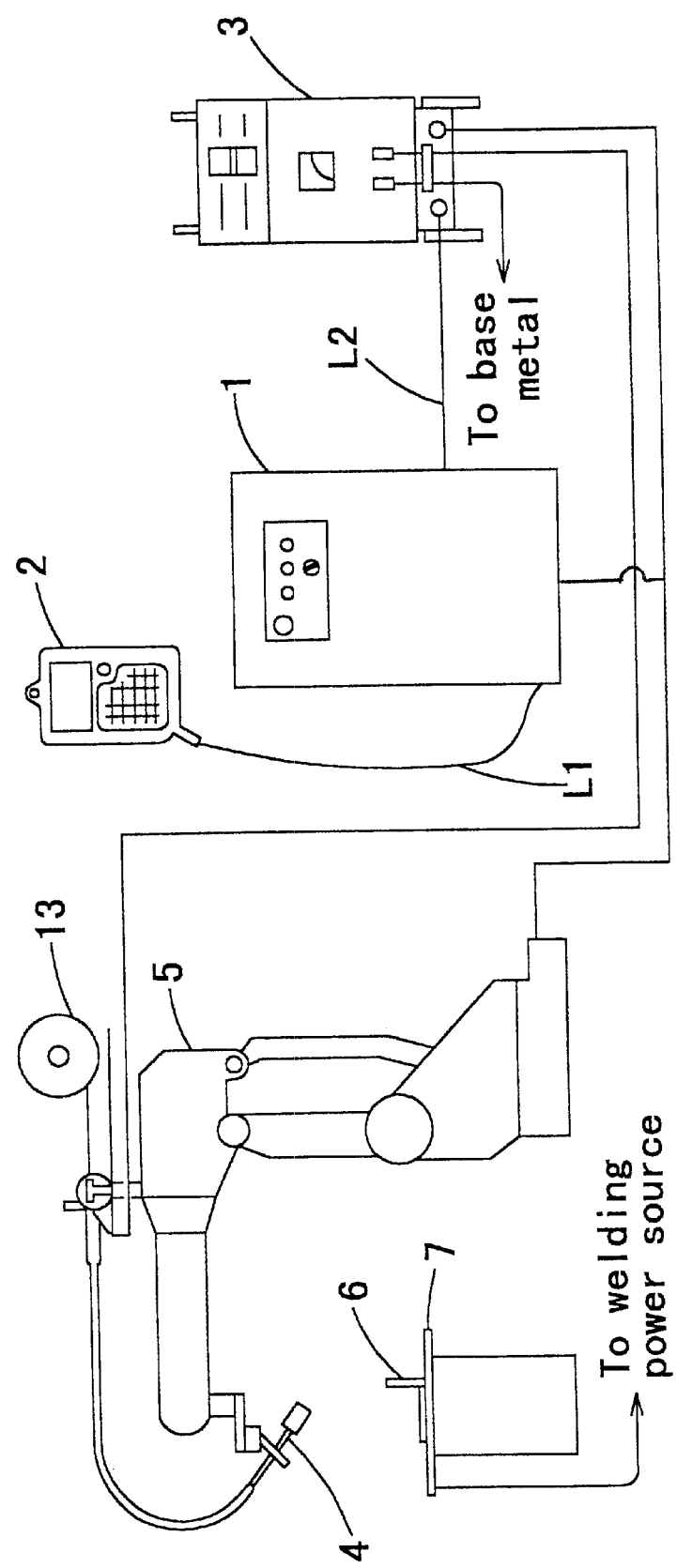
FIG. 1 is a view showing an overall system configuration for digital communication of welding conditions in a welding apparatus in accordance with an embodiment of the present invention.

Referring to FIG. 1, a robot controller 1 is provided with a TP (teaching pendant) 2 for teaching, and is connected thereto via a communication control line L1. The robot controller 1 is also connected to a welding power source 3 via a communication control line L2. By minutely operating a robot body 5 while directly watching a welding torch 4 disposed at the control reference point of an industrial robot, the operator sequentially carries out teaching in accordance with work steps to be conducted by the robot. The operator secures a workpiece 6, which is used as a substance to be welded, to a base metal 7, and moves the welding torch 4 to point a of FIG. 2, which is used as a welding start point, by operating the TP 2. The operator carries out one-key registration to register teaching position data for the point, to register that the point is the welding start point, and to further register regular welding condition commands (a welding current command value of 200 amperes (hereinafter simply referred to as A) and a welding voltage command value of 24.0 volts (hereinafter simply referred to as V) in the case of FIG. 2) and a welding start command (arc-on sequence) by using the welding registration key (not shown) of the TP 2. Next, the operator moves the welding torch 4 to point b of FIG. 2, which is used as the welding end point by operating the robot body 5. The operator then carries out one-key registration to register teaching position data for the point, to register that the point is the welding end point, and to further register crater welding condition commands (a welding current command value of 160 A and a welding voltage command value of 21.5 V in the case of FIG. 2) and a welding end command (arc-off sequence) by using the welding end key (not shown) of the TP 2.

Figure 3:
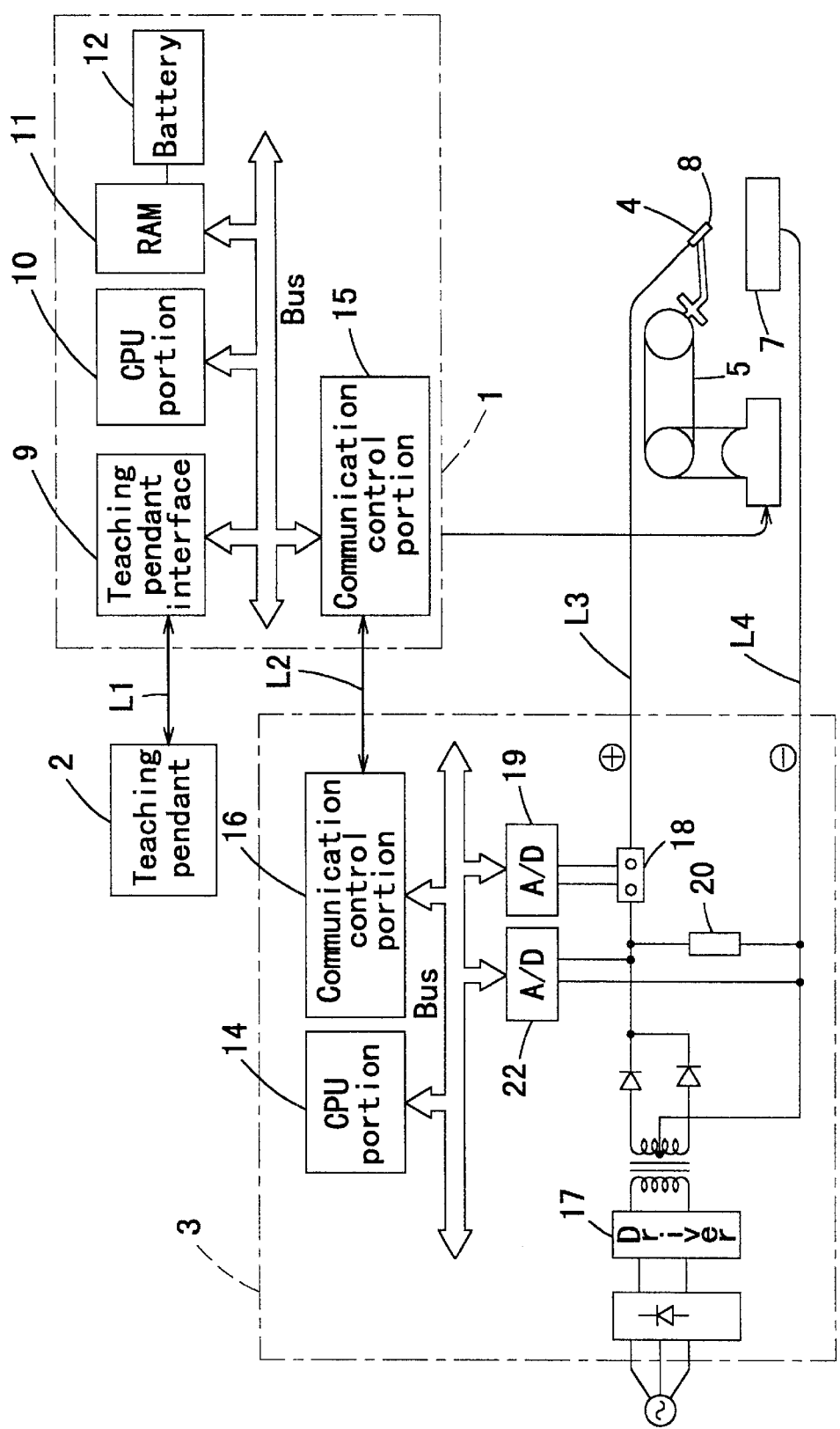
FIG. 3 is a block diagram showing an overall circuit for digital communication of welding conditions in the welding apparatus in accordance with the embodiment of the present invention.
Figure 4:
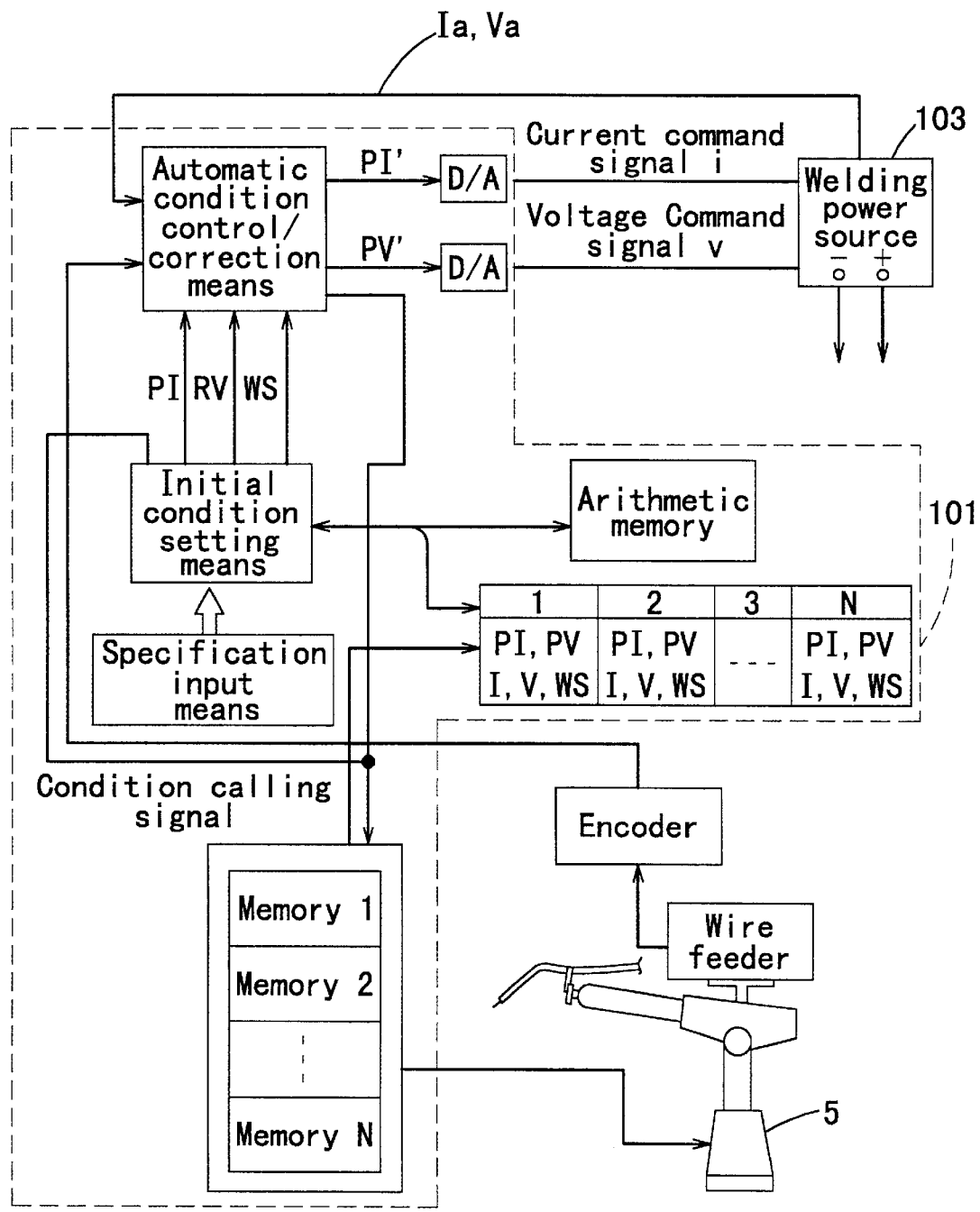
FIG. 4 is view showing a system configuration for transmission of welding conditions in a prior art embodiment.

The program created by the teaching is processed by a CPU portion 10 via a teaching pendant interface 9 and a bus, and stored as data in a RAM 11 shown in FIG. 3. The welding system shown in FIG. 1 is operated automatically by the program created by the teaching.

Welding operation is carried out as described below. When the welding torch 4 of the robot body 5 reaches the predetermined welding start position for the workpiece 6, i.e., the point a of FIG. 2, the robot controller 1 digitally transmits the previously stored regular welding conditions (the welding current command value of 200 A and the welding voltage command value of 24.0 V in the case of FIG. 2) as immediate values to the welding power source 3 via the communication control line L2, and then executes the welding start command. After an arc answer is returned from the welding power source 3, the robot controller 1 controls the robot body 5 so that the welding torch 4 moves in accordance with the predetermined welding passage for the workpiece 6 to carry out arc welding at a previously stored welding speed.

Figure 2:
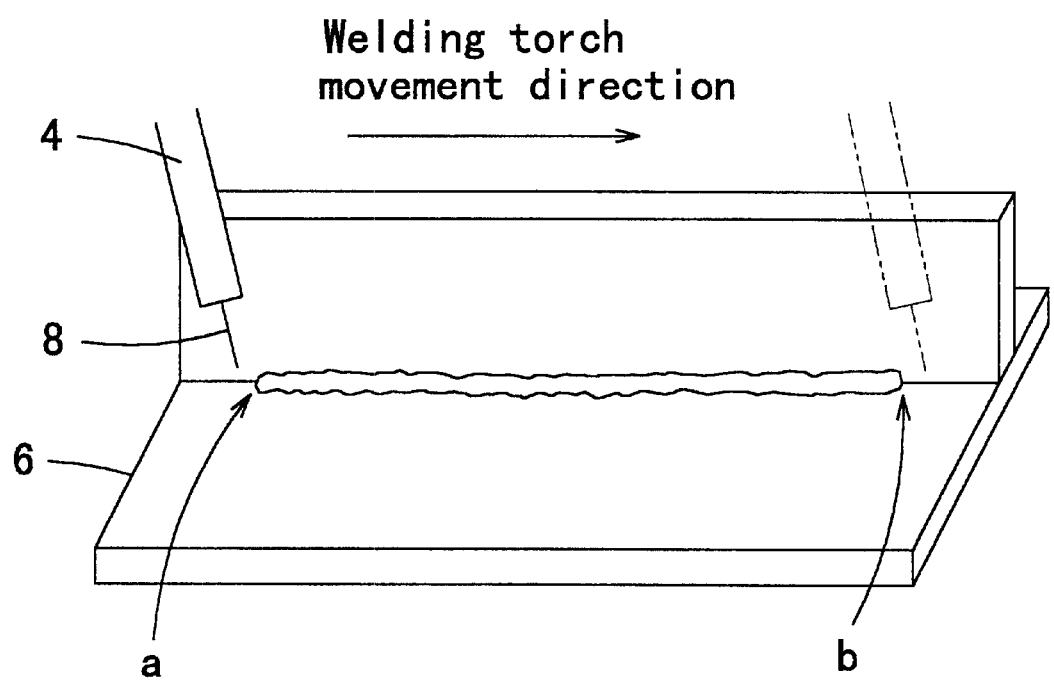
FIG. 2 is a schematic perspective view showing a welding process.

When the welding torch 4 reaches the welding end point, i.e., the point b of FIG. 2, the robot controller 1 digitally transmits the previously stored crater welding conditions (the welding current command value of 160 A and the welding voltage command value of 21.5 V in the case of FIG. 2) as immediate values to stop the robot, and the welding end command is executed in accordance with the execution of crater processing. A known stick check is then carried out. If a consumable electrode (wire) 8 is not fused to the workpiece 6, the welding torch 4 moves to the next teaching point.

Next, a first embodiment in accordance with the present invention will be described below referring to FIGS. 1 to 3. First, referring to FIG. 3, when started externally, the robot controller 1 moves the welding torch 4 of the robot body 5 to the predetermined welding start position for the workpiece 6, i.e., the point a, in accordance with the program created by the teaching and stored in the RAM 11.

Next, when the welding torch 4 reaches the welding start point, the robot controller 1 stops the operation of the robot body 5 and digitally transmits the welding condition commands as immediate values from the transmission control portion 15 to the communication control portion 16 of the welding power source 3 via the communication control line L2, whereby the CPU portion 14, i.e., a digital circuit portion, receives the regular welding conditions as immediate values.

The following are some of the communication specifications in the data link layer.

| | |
|---|---|
| Baud rate: | 9600 bps |
| Data bits: | 8 bits |
| Parity: | Even |
| Stop bits: | 2 bits |
| Communication system: | Full duplex |
| X parameter: | Not used |

The specifications of other detailed communication protocols and data formats are omitted here. The welding current command value is two-byte data comprising character code a and a low-order value (up to 255) of the welding current command value, one-byte data, and character code b and a high-order value (256 or more) of the welding current command value, one-byte data. Next, the welding voltage command value is two-byte data comprising character code c and a low-order value (up to 255) of the welding voltage command value, one-byte data, and character code d and a high-order value (256 or more) of the welding voltage command value, one-byte data. The robot controller 1 carries out data transmission to send character code e and a welding speed (up to 255), one-byte data, to the welding power source 3.

The 10-times value of the command value is transmitted as the welding voltage command, and the 100-times value of the teaching speed value is transmitted as the welding speed. These are divided by 10 and 100, respectively, on the receiving side (the welding power source). In the case of FIG. 2, regular welding conditions previously stored from the robot controller 1 to the welding power source 3 are the welding current command value of 200 A and the welding voltage command value of 24.0 V. The welding current command value of 200 A comprises character code a and data C8h, and character code b and data 00h. The welding voltage command value of 24.0 V comprises character code c and data F0h, and character code d and data 00h (an immediate value). These command values are transmitted. When the welding start command is digitally transmitted after the command values are transmitted, the CPU portion 14 activates a driver 17 by using a control circuit (not shown) at the welding power source 3, and welding energy is generated. The welding energy is transmitted to the consumable electrode (hereinafter referred to as a wire) 8 from the + output L3 of the welding power source 3. The wire 8 is fed to the workpiece 6 from a wire feeder 13 shown in FIG. 1. The workpiece 6 is connected to the—output L4 of the welding power source 3. When the wire 8 makes contact with the workpiece 6, electric energy nearly amounting to 200 A and 24.0 V flows from the end of the wire 8 to the workpiece 6, thereby beginning to melt the wire 8 and part of the workpiece 6. This is the start of arc welding.

When arc welding starts, the communication control portion 16 of the welding power source 3 returns an arc answer to the robot controller 1 via the communication control line L2. After receiving this arc answer, the robot controller 1 starts operating the robot body 5 at the predetermined welding speed in accordance with the previously stored teaching data, whereby welding is carried out by starting the movement of the welding torch 4 along the predetermined welding passage for the workpiece 6.

During the welding, in order to perform welding control, the welding power source 3 obtains an actual welding current value via a DCCT (Hall device) 18 and an A/D converter 19, and also obtains the voltage across a bleeder resistor 20 as an actual welding voltage value via an A/D converter 22. The welding power source 3 stores the obtained data and averages the data at each sampling time to carry out welding control.

Next, when the welding torch 4 reaches the welding endpoint, the point b of FIG. 2, the robot controller 1 digitally transmits the previously stored crater welding conditions to the welding power source 3. Next, the robot controller 1 digitally transmits the welding end command. The welding end command is executed, and then the known stick check is carried out. If the wire 8 is not fused to the workpiece 6, the welding torch 4 moves to the next teaching point.

As described above, in the welding apparatus for the arc welding robot system in accordance with the first embodiment, the control systems of both the robot controller 1 and the welding power source 3 are digital circuits mainly comprising microcomputers. In the teaching playback type arc welding robot controller 1, when the robot arm (the welding torch) reaches the welding start point, the robot controller 1 issues the welding condition commands (the welding current value and the welding voltage value) to the welding power source 3. In a similar manner, when the robot arm (welding torch) reaches the welding end point, the robot controller 1 issues the crater welding condition commands (the welding current value and the welding voltage value) to the welding power source 3. The teaching playback type arc welding robot controller 1 and the welding power source 3 have the digital communication control portions 15 and 16, respectively, so that the welding condition commands can be issued as digital data. This configuration solves the problem encountered in the conventional analog interface with the welding power source. In other words, in the configuration of the conventional analog interface, wherein the welding current and voltage command values, which are digital data, are D/A converted and transmitted from the robot controller to the welding power source, and at the welding power source, the analog command voltages respectively corresponding thereto are received and A/D converted into digital data to carry out welding control, conversion errors are included because of the existence of analog circuits. This causes the problem wherein the welding current and voltage command values transmitted from the robot are different from the welding current and voltage command values received at the welding power source. However, the present embodiment can solve this problem. In addition, the present embodiment is free from the problem encountered in the conventional analog interface, wherein the analog circuits are affected by drift because of changes in environment (temperature in particular) and changes with time.

Furthermore, in the case of the prior art embodiment, when the welding power source 103 or the robot controller 101 becomes faulty and is replaced, welding confirmation adjustment comprising welding and condition calling must be carried out, because the individual analog circuits are slightly different from each other, although there is no difference in model and even when the teaching data is identical. This causes the problem of being unable to resume the operation of the robot welding system promptly. However, in the case of the present embodiment, even when the welding power source 3 or the robot controller 1 becomes faulty and is replaced, this problem does not occur, whereby this problem can also be solved.

Moreover, in the automatic welding line using the robot and the welding power source 3 of the first embodiment, the robot controller 1 and the welding power source 3 are provided with the digital communication control portions 15 and 16, respectively, and the welding current and voltage command values, which are digital data, are transmitted from the robot to the welding power source by digital communication. This configuration is advantageous in that conversion errors because of the existence of the conventional analog circuits are not included. In addition, the digital communication time in the case of the first embodiment, 9 to 10 msec, is far shorter than the conventional analog conversion time, 70 to 80 msec. Therefore, the present embodiment is effective in providing an arc welding robot system capable of quickly transmitting information from the robot controller 1 to the welding power source 3 and also capable of carrying out prompt welding control.

Next, a second embodiment in accordance with the present invention will be described below referring to FIGS. 1 to 3. The welding system shown in FIG. 1 is operated automatically as follows. When the welding torch 4 of the robot body 5 reaches the predetermined welding start position for the workpiece 6, i.e., the point a of FIG. 2, the robot controller 1 transmits the previously stored regular welding conditions (the welding current command value of 200 A and the welding voltage command value of 24.0 V in the case of FIG. 2) to the welding power source 3 via the communication control line L2. Furthermore, to the welding power source 3, the robot controller 1 transmits the movement speed (a welding speed of 0.8 m/minute in the case of FIG. 2) of the end (arc generation point) of the wire 8 of the welding torch 4 held by the robot along the welding passage by using character code e and an immediate value of data 50h. Next, when an arc answer is returned from the welding power source 3 after the welding start command is digitally transmitted, the robot controller 1 controls the robot body 5 so that the welding torch 4 moves in accordance with the predetermined welding passage for the workpiece 6 to carry out arc welding at the above-mentioned previously stored welding speed.

When the welding torch 4 reaches the welding end point, i.e., the point b of FIG. 2, the robot controller 1 digitally transmits the previously stored crater welding conditions (the welding current command value of 160 A and the welding voltage command value of 21.5 V in the case of FIG. 2) to stop the robot, and the welding end command is executed in accordance with the execution of crater processing. The known stick check is then carried out. If the consumable electrode (wire) 8 is not fused to the workpiece 6, the welding torch 4 of the robot body 5 moves to the next teaching point.

As described above, in the configuration of the second embodiment, wherein the robot controller 1 and the welding power source 3 have the above-mentioned digital communication control portions 15 and 16, respectively, when the robot arm (the welding torch) reaches the welding start point, the welding condition commands (the welding current value and the welding voltage value) and the welding speed, which is previously designated by teaching and stored in the memory of the robot controller 1, are transmitted from the robot controller 1 to the welding power source 3 as digital data. By this transmission, the welding control in accordance with the above-mentioned three kinds of welding condition commands (current, voltage and speed) is made executable at the welding power source 3. Unlike the prior art embodiment, the present embodiment is not required to be provided with individual hardware devices for outputting signals corresponding to the welding current, voltage and speed. Only the digital communication control portions 15 and 16 are provided for the robot controller 1 and the welding power source 3, respectively, whereby the embodiment of the present invention is excellent in expandability.

What is claimed is:
1. A welding apparatus comprising:

a robot having a means for welding;

a welding power source for supplying electric power to said welding means;

a teaching playback robot controller for teaching and controlling an operation of said robot, said robot controller comprising:
- a teaching device for teaching a sequence of said operation of said robot so that said welding means moves to welding positions,
- a memory means for storing teach position data obtained by said teaching device, for storing welding condition commands corresponding to said teach position data and including predetermined welding current command values;
- a first CPU portion for controlling said robot in accordance with said teach position data and said welding condition commands; and
- a first digital communication control portion for communication between said first CPU portion and said welding power source;
- wherein said welding power source has a second digital communication control portion for communication with said first digital communication control portion and a second CPU portion for controlling said welding power source by executing said welding condition commands transmitted by said first CPU portion as digital data from said memory means via said first digital communication control portion to said second CPU portion via said second digital communication control portion.

2. A welding apparatus in accordance with claim 1, wherein:

said memory means stores the welding speed of said robot together with said welding condition commands;

said first CPU portion of said robot controller transmits the information of said welding speed as digital data to said second CPU portion of said welding power source via said first and second digital communication control portions at the start of welding; and said second CPU portion of said welding power source performs welding control depending on said welding speed.

* * * * *